United States Patent Office 3,212,847
Patented Oct. 19, 1965

3,212,847
REDUCTIVE CHLORINATION OF ACTIVATED
ORES CONTAINING HIGH MELTING METALS
Bernard J. Lerner, O'Hara Township, Allegheny County,
Pa., assignor to Dominion Gulf Company, Pittsburgh,
Pa., a corporation of Pennsylvania
No Drawing. Filed Feb. 26, 1962, Ser. No. 175,841
9 Claims. (Cl. 23—16)

This invention relates to an extractive metallurgical process for recovering high melting metals such as columbium from relatively nonrefractory ores containing large proportions of gangue materials in comparison with such metals, and more particularly to the recovery of columbium or the like from low grade ores containing the same in a chemically nonrefractory form by a relatively selective, vapor phase reductive chloridizing treatment.

The most common present-day commercial sources of columbium and tantalum metals are columbite and tantalite ores, which contain the metals indicated in a chemically refractory, oxide form. These ores can ordinarily be concentrated or beneficiated by known mineral dressing procedures, taking advantage of existing differences between the physical properties of the columbite or tantalite components of the ores and the gangue materials. Thereafter, columbium and/or tantalum can be extracted by relatively drastic chemical treatment. Naturally, the selectivity of this drastic chemical treatment, as between columbium and tantalum and other materials in the ore, is not outstanding because of the severity of the chemical action required to release the metals from their chemically refractory, oxidic forms.

Unlike columbite and tantalite and other oxidic and possibly sulfidic ores, pyrochlore type ores, that is, ores in which the metal is present in the form of a complex oxygen- and fluorine-containing material, frequently cannot be readily concentrated, either at all, or at least without relatively elaborate and/or costly procedures, except that some degree of beneficiation is usually obtainable by removal of the calcite, magnetite or other selected portions of the gangue. In view of the difficulties encountered in concentrating the ore, direct chemical extraction, as by reductive chlorination, of unbeneficiated pyrochlore type ores has been proposed. However, previously proposed, direct chemical extraction procedures are not entirely satisfactory as high chlorine losses will be experienced when chlorination conditions are sufficiently drastic to insure good columbium extraction, owing to the concurrent, nonproductive chlorination of gangue materials, and as poor columbium extraction normally will be obtained when the chlorination conditions are sufficiently mild to maintain chlorine losses at a low level.

The present invention relates to a process for extracting columbium or the like from ores containing the same and that are chemically nonrefractory in their naturally occurring or untreated form and that are in an unbeneficiated or partially beneficiated form, that is, that contain predominant proportions of gangue materials relative to the desired metal, whereby good metal extraction is obtained at relatively low throughputs of chlorinating agent without undue losses of chlorinating agents to the gangue materials. It has now been found that a relatively selective extraction of columbium from the unwanted materials present in the ore can be obtained by a treatment involving (a) activating the ore for reductive chlorination by intimately contacting the ore in finely divided form with oxygen, either as such or in the form of an oxygen-containing gas such as air, at an elevated temperature, typically in the range of about 200° C. to about 500° C., preferably about 300° C. to 450° C. in a ratio ordinarily in the range of about 0.017 pound or more, preferably 6.1 pounds or more, of oxygen per pound of ore, and for a time, usually between about 20 minutes and 12 hours, effective to increase the susceptibility of the ore to reductive chlorination under the conditions of the process, and (b) effecting reductive chlorination of the activated ore. Reductive chlorination of the activated ore is effected by contacting the same with a vapor phase reductive chlorinating agent such as a organic or inorganic chloride that will yield a nonhydrogenous reducing agent at the reaction conditions. Carbon tetrachloride is a specific example of a useful organic chlorinating agent, but other suitable reductive chlorinating agents, for example, phosgene, as well as still other agents of the kind indicated can be used satisfactorily. The reductive chlorination is carried out at a temperature sufficient to form the chloride of the metal to be extracted and sufficient to volatilize the same, but insufficient to chlorinate a substantial proportion of the gangue materials. Ordinarily, the reductive chlorination will be carried out at a temperature in the range of about 240° C. and about 450° C., preferably about 315° C. to 400° C. The metals extracted from the ore are removed as vaporous chlorides from the reaction mixture. The desired metallic chlorides are thereafter recovered from the over-all mixture of vaporous chlorides. Although the process of this invention is especially beneficial in connection with the low grade columbium and tantalum containing ores of the pyrochlore or complex oxyfluoride type for which it has been developed, the process also can be used to extract other high melting point metals that form low-boiling chlorides from ores that contain such metals in a chemically nonrefractory form and that contain predominant proportions of gangue materials, and the extraction of such other metals is included by the present invention.

The activating, oxygen treatment to which the ores referred to herein are subjected can be carried out in a variety of ways. For best columbium extraction and a relatively low level of iron contamination, it is preferred that the oxygen treatment be carried out separately from and prior to the reductive chlorination treatment. However, this is not absolutely essential, as the oxygen treatment has been found to produce some improvement in columbium extraction even when carried out concurrently with the reductive chlorination.

Whether the activating treatment is carried out prior to chlorination, as preferred, or concurrently with chlorination, it is important that intimate contact between the oxygen-containing gas and the ore be obtained. To this end, the ore should be in finely divided form, so as to insure a large surface area. When the ore is finely ground to a fluidizable solids range, that is, such as to permit fluidization at superficial, linear, fluidizing gas velocities in the range of about 0.03 to 1.5 ft. per second, preferably 0.5 to 1 ft. per second, as will be the case when the ore is ground to a size sufficiently small to pass a 65-mesh screen, for example, and the gas contact is effected by fluidization of the particles with air or other oxygen-containing gas, a noticeable improvement is obtainable after as little as 20 minutes or less of contact in the preferred temeprature range of about 300° to 400° C. A major improvement is usually obtainable under these conditions in about 45 to 65 minutes, but longer heating periods can be utilized, if desired. When the contact between ore and oxygen is less intimate, as when the ore is merely heated in air while in a stationary position, prolonged heating, even up to as much as 12 hours or more, may be desirable, although satisfactory results have been obtained in as little as four hours. However, even with the prolonged treatment, less intimate contact between the ore and gas may result in lower columbium extraction than will be obtained with a much shorter treating time under the preferred conditions.

As an illustration of ore particle sizing effective to provide the desired intimate oxygen-ore contact, it may be mentioned that a typical sample of a columbium pyrochlore ore of the kind described herein that was found to produce good columbium extraction in accordance with the present process, when ground to pass a 65-mesh screen, had the following size distribution:

| Mesh: | Percent |
|---|---|
| +65 | 1.47 |
| −65, +100 | 3.82 |
| −100, +150 | 10.86 |
| −150, +200 | 12.62 |
| −200, +325 | 22.21 |
| −325 | 49.02 |

However, other particle size distributions in the range of about 50 to 400 mesh can be used.

The presence of oxygen is essential to the activating treatment, as it has been noted that comparable experimental runs carried out with an inert gas on the one hand and air on the other hand resulted in a marked superiority in columbium extraction for the air pre-treatment only. Naturally, there must be sufficient oxygen present in the gas contacted with the ore to effect the desired activation. Satisfactory results are obtainable when the oxygen to ore ratio is equivalent to that which exists when the ore is contacted with at least about 0.05 cubic foot air, preferably about 0.1 to 0.2 cubic foot of air, per pound of ore, per minute, over the prescribed treating period. No adverse results insofar as columbium extraction is concerned will be obtained by the use of greater oxygen:ore ratios, but as a practical matter, it normally will not be advantageous to exceed oxygen:ore ratios of the magnitude existing when the ore is contacted with 0.5 cubic foot air per pound of ore per minute. The air:ore ratios indicated correspond to about 0.017 to 6.09 lbs. oxygen per pound of ore, for treating times of 20 minutes to 12 hours, and oxygen:ore ratios of about 0.1 to 0.2 lb. oxygen per pound of ore are preferred for treating times of about one hour.

The temperature of the oxygen activation treatment is also important. Some advantage is achieved by the herein-described oxygen pretreatment at relatively low throughputs of chlorinating agent, using activating temperatures as low as about 200° C. Some metal recovery can be obtained at even lower temperatures provided the throughput of chlorinating agent is increased sufficiently to compensate for the lower temperatures, but this procedure is not commercially advantageous. For practical purposes, it is preferred to carry out the oxygen treatment at slightly higher temperatures, say 25° to 50° higher than the reductive chlorination treatment, so as to maintain the temperature of the chlorination treatment at the desired level. Accordingly, the oxygen treatment normally will be carried out at temperatures not exceeding about 500° C., preferably 450° C. or less. Substantially higher temperatures should not be employed, as such treatment can render the ore insensitive to reductive chlorination at the conditions disclosed herein. For example, when a sample of columbium pyrochlore ore of the kind previously referred to was subjected to a preliminary oxygen treatment at 800° C., essentially no columbium was recovered therefrom by subsequent reductive chlorination.

The pressure at which the activation treatment is carried out has not been found to be critical. Good results are obtainable at ordinary ambient atmospheric pressures or pressures slightly in excess of atmospheric. However, greater or lesser pressures can be employed if desired.

Any mechanical means of effecting intimate contact between the ore and oxygen can be used. Excellent results have been obtained by effecting the treatment in a fluidized bed with air as the fluidizing gas, but other ways of effecting solids-gas contact can be used. For example, a rotary kiln furnished with a continuous supply of air in the required amounts can be used. When a stationary heating surface is employed, the ore should be rabbled from time to time to expose new surfaces to oxygen.

The exact mechanism by which the activating oxygen treatment improves columbium recovery by reductive chlorination at the conditions disclosed herein is not fully understood. However, it is clear that the herein-disclosed activating treatment is entirely distinct from previously proposed rotating or calcining processes, as these latter treatments are carried out under conditions sufficiently severe to effect a chemical change in the ore. No physical or chemical change has been detected in the columbium pyrochlore ores treated in accordance with the relatively mild conditions of the herein-described activating treatment. On the other hand, it is also clear that the herein-disclosed preliminary oxygen treatment is clearly distinct from mere drying of the ore, as treatment of columbium pyrochlore ores in the presence of an inert gas, nitrogen, under the conditions disclosed herein, failed to active the ore for reductive chlorination.

In carrying out the reductive chlorination of the ore, any suitable reductive chlorinating agent that will be in vapor phase at the reaction conditions and that is capable of yielding a substantially hydrogen-free reducing agent at the reaction conditions can be used. Phosgene is an example of a preferred agent, but other organic or inorganic chlorides can be used. Examples of other chlorides of both classes are carbon tetrachloride, octachloropropane, hexachloroethane, sulfur monochloride, sulfur dichloride and equivalents thereof. These materials can be employed as such or they can be diluted with a carrier gas, such as nitrogen or argon.

Satisfactory columbium recoveries can be obtained at reductive chlorination temperatures as low as about 240° C., but temperatures at least as great as the boiling point of ferric chloride, about 315° C., are preferred when iron is present in the ore, as will normally be the case, in order to minimize agglomeration of ore particles and in order to obtain good chlorination selectivity. Somewhat higher temperatures, for example up to about 450° C. or more, can be employed, but chlorination selectivity declines with increasing temperature. Accordingly, when the temperature of the chlorination reaction is too high, undue losses of chlorine to the gangue materials will be encountered, and a heavier load may be placed upon the chloridized product purification facilities. The reaction is suitably carried out at ambient atmospheric pressures or at pressures slightly in excess thereof such as are typically encountered in fluidized solids reaction systems, but greater or lesser pressures can be used.

The reductive chlorination reaction is thought to take place rapidly with respect to the oxygen activated ore. At the preferred reaction conditions, there is reason to believe that a reaction time of a few minutes may be all that is involved. However, as a practical matter, when dealing with large masses of ore longer times of contact may be desirable to insure thorough contact between the chlorinating agent and the ore particles. When operating with a fluidized bed of ore at reductive chlorinating temperatures of about 350° C., good columbium extractions are obtainable with average reactor residence times for the ore, that is, reaction times, of about 20 to 45 minutes, although longer or shorter times can be used.

The amount of chlorinating agent employed should of course be sufficient to chlorinate all of the columbium or other metal to be recovered in the ore. The absolute amount required for this purpose will of course vary with the columbium content of the ore and the chlorinating agent employed. In order to allow for chlorine losses and less than 100 percent chlorine utilization, I prefer to employ the reductive chlorinating agent in an amount such that the available chlorine will be at least about 3 and preferably about 5 to 20 times the stoichiometric amount required to react with the columbium present in the ore. Thus, where the columbium content of an ore is about 0.6 percent, calculated as columbium oxide, good columbium extraction will be obtained by the use of the reductive chlorinating agent in an amount sufficient to provide about 6 to 18 pounds or more of chlorine per 100 pounds of ore. Not all of the chlorine supplied to the reactor need be in the form of fresh chlorinating agent, and part can be supplied by recycling the unreacted chlorine in the reaction off-gas. An indication of the suitability of the off-gas for recycle is given by the following off-gas analysis which was obtained while charging 7.87 pounds of columbium pyrochlore ore per pound of carbon tetrachloride to the chlorination reaction:

*Gas, percent, adjusted for 0 percent nitrogen and argon*

| $O_2$ | $CO_2$ | CO | $COCl_2$ | $CCl_4$ | $S_2Cl_2$ | HCl | $Cl_2$ |
|---|---|---|---|---|---|---|---|
| 7.3 | 17.7 | 8.3 | 27.4 | 21.2 | 0 | 13.1 | 5.0 |

Inasmuch as the reductive chlorination treatment involves a chemical reaction, contact between the ore and the chlorinating agent again should be intimate. To this end, what has been said with respect to ore particle size, contacting methods and the like regarding the oxygen activation treatment also applies here. Thus, best contact is obtained by reacting the ore in finely divided form, preferably in a form sufficiently small, for example, less than 65 mesh, to permit fluidization at superficial linear gas velocities of about 0.03 foot to 1.5 feet per second and preferably 0.5 to 1.0 foot per second. Not all of the fluidizing gas need be fresh and/or recycle chlorinating agent, and part of the fluidizing gas requirements can be supplied by diluent gases.

The herein-disclosed process has been found highly effective for use in connection with low-grade columbium pyrochlore ores, which are distinguished from ordinary columbite ores, among other things, by their oxygen- and fluorine-containing composition, by the difficulty with which they can be concentrated or beneficiated, and more particularly for purposes of this invention, by the fact that they are chemically nonrefractory. The partial analysis of one sample of a columbium pyrochlore ore of the kind to which the present process is applicable was as follows:

|  | Percent |
|---|---|
| Calcium carbonate | 9.5 |
| Iron | 11.82 |
| Fluorine | 0.10 |
| Columbium | 0.32 |

Other materials found to be present in appreciable amounts by analysis of both unvaporized chlorination tailings and vaporized chlorination products are Al, Si, Na, and in trace amounts, Mg, Ti, Mn, K, Zr, Ba, and Cu. The raw ore was a pyroxenitic ore containing large amounts of acmite and aegirite type minerals, with minor amounts of feldspar, wollastonite, biotite, quartz, and apatite as gangue materials, together with a small amount of pyrochlore. As previously indicated, the process is considered useful in connection with other high melting point metal ores that are chemically nonrefractory in their naturally occurring form, especially ores of metals of Groups IV and V of the Periodic Table of Mendelyeev that form low-boiling chlorides. A specific example of such a metal is tantalum. Examples of other high melting metals that form low-boiling chlorides or oxychlorides are titanium, vanadium, chromium, zirconium, molybdenum, tungsten, and antimony. Contrary to what might be expected, the presence of predominant proportions of gangue materials relative to the desired metal is not harmful, as the process is essentially selective for metals that form low-boiling chlorides. In fact, the presence of the gangue materials appears to be beneficial.

Moisture in the ore, both adsorbed and chemically combined, is preferably reduced to a small amount before treatment in accordance with the herein-disclosed process, as its presence results in hydrolysis of the chlorinated metal to oxychloride, which, in the case of columbium, is a harmful impurity, as unless steps are taken to separate the oxychloride and/or to convert it into the corresponding chloride, it may tend to introduce oxygen into the final purified metal, whereby the properties of such metal itself are adversely affected. The moisture content of the ore is preferably maintained in the range of about 0 to 0.2 percent, but somewhat higher moisture content, say up to about 0.4 percent, can be tolerated, without undue losses of columbium to oxychloride. Normally, the moisture content of the ore will not be a serious problem, as the oxygen activation pretreatment described herein will be effective incidentally to reduce the moisture content to the preferred range.

Separation of gaseous metal chlorides from the reaction off-gases, purification of the resulting metal chlorides, and conversion of the desired metal chloride to the pure metal can be effected in any convenient way, as these steps as such do not go to the essence of the herein-described invention. Thus, for example, crude metal halides can be conveniently separated from reaction off-gases by fractional condensation. The condensed metal chlorides can then be further purified as desired. Thus, while the process as defined herein is essentially selective for the high melting metals in the ore that form low-boiling chlorides in the sense that only a small percent of the ore is chlorinated and volatilized, some impurities, notably ferric chloride, may be present in the volatilized reaction off-gases. This material is conveniently removed from the metal chloride gas stream by a passage through a salt bed. The ferric chloride can then be removed from the salt bed in the form of a low-melting eutectic solution. The desired metal chloride can ordinarily be separated from any other metal chlorides that may be present by fractional condensation, or by other means. The desired metal can then be recovered from the chloride form by reduction with hydrogen. Unreacted chlorinating agents can be removed from the residual gases by established techniques, such as absorption and stripping combinations, condensation or the like.

In order to demonstrate the effect on columbium extraction of the herein-disclosed oxygen-activating treatment, comparative experimental runs were carried out in which separate, one kilogram samples of a raw pyrochlore ore having a columbium content of 0.60 percent by weight, calculated as $Cb_2O_5$, and a calcite content of about 8.41 to 9.23 percent by weight, the balance being substantially all other gangue materials, principally sodium iron silicates, were ground to pass a 65-mesh screen and independently charged to a 7.2 cm. diameter stainless-steel, fixed fluid bed reactor and subjected to a variety of pretreatments and reductive chlorination treatments. After introducing the ore into the reactor, the reactor was closed and the temperature was brought up to 300° C. to 400° C. by passage of electric current through electrically insulated resistance windings wound about the reactor. After the desired pretreating temperature was reached, the ore was fluidized, using sufficient gas (two liters per minute) to keep the ore charged fluidized. Following pretreatment in this manner for a period of two hours, reductive chlorination of the columbium to vaporous columbium pentachloride was effected by introduction therein of carbon tetrachloride in vapor phase at the rate of about 6 grams per minute. A carrier gas, either nitrogen or dry air, as indicated, was also introduced into the reaction at the rate of 1 liter per minute. In these experiments carbon tetrachloride was employed in an over-all ratio with respect to the ore of 0.12 lb. $CCl_4$/lb. ore. The total reaction time was about 20 minutes. Off-gases from the reactor were collected and conducted to an air-cooled condenser, where columbium pentachloride, together with any metal chloride impurities such as ferric chloride, were recovered by condensation. In one pair of runs, air was employed as the pretreating gas and also as the diluent or carrier gas in the reductive chlorination phase. In another pair of runs nitrogen gas was employed as the fluidizing gas in the activating pretreating step and also as the carrier gas in the reductive chlorination step. In a third pair of runs air was employed in the activating pretreatment step and nitrogen was employed as the carrier gas in the reductive chlorination treatment. In still another pair of runs, nitrogen was employed as the fluidizing gas in the pretreating step, and air was employed as the carrier gas in the reductive chlorination step. The results of these runs are presented in the following table:

*Table A*

$CCl_4$ throughput=0.12 lb./lb.
Pretreating time=2 hrs.
Reaction temperature=350° C.
Ore Cb content=0.60% as $Cb_2O_5$

| Run No. | Pre-treating T., ° C. | Pre-treating Gas | Chlorination Carrier Gas | Cb Extraction, Percent | Product | |
|---|---|---|---|---|---|---|
| | | | | | Percent Cb | Percent Fe |
| 1 | 300 | Air | Air | 91 | 59 | 38 |
| 2 | 400 | Air | Air | 91 | 51 | 45 |
| 3 | 300 | $N_2$ | $N_2$ | 73 | 95 | 5 |
| 4 | 400 | $N_2$ | $N_2$ | 58 | 91 | 6.6 |
| 5 | 300 | Air | $N_2$ | 88 | 88 | 11 |
| 6 | 400 | Air | $N_2$ | 88 | 80 | 21 |
| 7 | 300 | $N_2$ | Air | 88 | 62 | 34 |
| 8 | 400 | $N_2$ | Air | 90 | 64 | 35 |

Comparison of the foregoing experimental results indicates that superior columbium extraction was obtained in every case where air was employed either as the pretreating gas or as the carrier gas during the chlorination step. Comparison of Runs 5 and 6 with Runs 7 and 8 indicates that while comparable columbium extraction was obtained both when air was employed as the pretreating gas and as the chlorination carrier gas, the use of air in the pretreating step only was advantageous in that product purity was substantially greater.

In other experimental runs carried out similarly as described above, nitrogen and air, respectively, were employed as the pretreating gases at the rate of 2 liters per minute, using a pretreating temperature of 350° C. and a pretreating time of one hour, which treatment was followed by reductive chlorination at about 330° C. with vaporous carbon tetrachloride only, at a charge rate of 6 grams per minute, at varying throughputs. The results of these runs were as indicated in the following table:

*Table B*

| Run No. | Pretreating Gas | $CCl_4$/1,000 g. Ore | Cb Extraction, Percent | Product | |
|---|---|---|---|---|---|
| | | | | Cb, Percent | Fe, Percent |
| 1 | $N_2$ | 60 | *19 | | |
| 2 | $N_2$ | 120 | *23.5 | | |
| 3 | Air | 62 | 70 | 94 | 6 |
| 4 | Air | 120 | *83.5 | *85.5 | *10 |

*Average of Two Runs.

Comparison of the runs indicated in the preceding table clearly shows a marked superiority with respect to columbium extraction for the oxygen activating pretreatment at advantageously low chlorine:ore ratio. Low chlorine:ore ratios are beneficial in that they tend to starve side reactions that result in nonproductive consumption of chlorine by gangue materials and for the reason that the size, and hence the cost, of any chlorination reagent recovery and recycle system employed in the process will be a function of the over-all ratio of the chlorination reagent to ore.

In another embodiment a raw columbium pyrochlore ore of the character indicated and containing 0.71 percent Cb as $Cb_2O_5$ was continuously fed to a fluidized bed pretreating zone at the rate of 80.5 lb./hr. Pretreatment was effected by introduction of 0.72 s.c.f./min. of air as fluidizing gas. The ore in the pretreating step was maintained at a temperature about 635° F. for an average contact time of about one hour. The pretreated ore, having a moisture content of 0.08 percent, was then removed to a storage hopper, provided with electrical resistance windings to maintain the pretreated ore at the desired temperature. Pretreated ore, at a temperature of 635° F., was continuously fed to an eight-inch diameter fluidized reactor at the rate of 49.0 lbs./hr. The ore in the reactor was maintained in fluidized form by introduction of 12.25 pounds per hour of phosgene ($COCl_2$), to provide an over-all gas-solids ratio of 0.250 pound $COCl_2$/lb. of ore. Off-gases from the reactor were conducted to an air-cooled condenser, where the crude columbium pentachloride product was recovered by fractional condensation. The columbium extraction in this run was 88.4 percent.

Good results can also be obtained by substitution in the preceding embodiments of other chemically nonrefractory ores containing predominant proportions of gangue materials and that contain high melting point metals that form low boiling chlorides, of the kind disclosed herein, and by the substitution of other equivalent oxygen-containing gases, and reductive chlorinating agents as disclosed herein. Similarly, good results will also be obtained by varying the process conditions in the manner and within the limits disclosed herein.

Numerous other modifications and variations of the invention as described herein will suggest themselves to those skilled in the art and such modifications and variations can be resorted to without departing from the spirit and scope of the herein-described invention. Accordingly, the invention is not to be limited by the embodiments disclosed herein but only by the scope of the claims appended hereto.

I claim:
1. An extractive metallurgical process for extracting in chloride form a high melting metal selected from the group consisting of columbium, tantalum, titanium, vanadium, chromium, zirconium, molybdenum, tungsten and antimony, and that forms a low boiling chloride, from an ore containing such metal in a complex oxyfluoride form, that is nonrefractory to reductive chlorination and that contains a predominant proportion of gangue materials, comprising activating said ore for reductive chlorination by intimately contacting the ore in finely divided form with oxygen at an elevated temperature in the range of about 200° C. to 500° C., for a period in the range of about 20 minutes to 12 hours and until the susceptibility of the ore to reductive chlorination is significantly increased and thereafter, as a second step, forming a vaporous chloride of said metal by reductive chlorination of the activated ore in the substantial absence of oxygen gas with a vapor phase reductive chlorinating agent that forms a nonhydrogenous reducing agent at the conditions of the reaction, said agent being selected from the group consisting of phosgene, carbon tetrachloride, octachloropropane, hexachloroethane, sulfur monochloride and sulfur dichloride, at a temperature in the range of about 240° C. to 450° C. and sufficient to form said vaporous metal chloride and insufficient to chlorinate a substantial proportion of the gangue materials, removing vapor phase materials, including said vaporous metal chloride, from the reaction mixture and recovering said metal chloride therefrom.

2. The process of claim 1, where the activating treatment and the reductive chlorination are carried out with the ore in the form of a fluidized bed.

3. The process of claim 1 where said ore is a columbium pyrochlore ore, and where said metal is columbium.

4. The process of claim 1 where said reductive chlorinating agent is phosgene.

5. An extractive metallurgical process for extracting in chloride form a high melting metal selected from the group consisting of columbium, tantalum, titanium, vanadium, chromium, zirconium, molybdenum, tungsten and antimony, and that forms a low boiling chloride, from an ore containing such metal in a complex oxyfluoride form, that is nonrefractory to reductive chlorination and that contains a predominant proportion of gangue materials, comprising activating said ore for reductive chlorination by intimately contacting the ore in finely divided form with oxygen in a proportion of at least about 0.017 pound per pound of ore for a period in the range of about 20 minutes to 12 hours at an elevated temperature in the range of about 200° C. to 500° C. and until the susceptibility of the ore to reductive chlorination is significantly increased, and thereafter, as a second step, forming a vaporous chloride of said metal by reductive chlorination of the activated ore in the substantial absence of oxygen gas with a vapor phase reductive chlorinating agent that forms a nonhydrogenous reducing agent at the conditions of the reaction, said agent being selected from the group consisting of phosgene, carbon tetrachloride, octachloropropane, hexachloroethane, sulfur monochloride and sulfur dichloride, in a proportion sufficient to furnish at least about three times the stoichiometric amount of chloride required to react with said metal, at a temperature in the range of about 240° C. to 450° C. and sufficient to form said vaporous metal chloride and insufficient to chlorinate a substantial proportion of the gangue materials, removing vapor phase materials, including said vaporous metal chloride, from the reaction mixture and recovering said metal chloride therefrom.

6. An extractive metallurgical process for extracting in chloride form a high melting metal selected from the group consisting of columbium, tantalum, titanium, vanadium, chromium, zirconium, molybdenum, tungsten and antimony, and that forms a low boiling chloride, from an ore containing such metal in a complex oxyfluoride form, that is nonrefractory to reductive chlorination and that contains a predominant proportion of gangue materials, comprising activating said ore for reductive chlorination by intimately contacting the ore in finely divided form with air in the proportion of about 0.1 to 0.2 cubic foot per pound of ore per minute, for about 45 to 65 minutes, at an elevated temperature in the range of about 300° C. to 450° C. and about 0° C. to 50° C. above the temperature at which reductive chlorination is effected, and thereafter, as a second step, forming a vaporous chloride of said metal by reductive chlorination of the activated ore in the substantial absence of oxygen gas in finely divided form with a vapor phase reductive chlorinating agent that forms a nonhydrogenous reducing agent at the conditions of the reaction, said agent being selected from the group consisting of phosgene, octachloropropane, hexachloroethane, sulfur monochloride, sulfur dichloride and carbon tetrachloride, in a proportion such as to provide about 5 to 20 times the stoichiometric amount of chlorine required to react with said metal, at a temperature sufficient to form said vaporous metal chloride and insufficient to chlorinate a substantial proportion of the gangue materials, said temperature being in the range of about 300° C. to 400° C., removing vapor phase materials, including said vaporous metal chloride, from the reaction mixture and recovering said metal chloride therefrom.

7. An extractive metallurgical process for extracting in chloride form a high melting metal selected from the group consisting of columbium, tantalum, titanium, vanadium, chromium, zirconium, molybdenum, tungsten and antimony, and that forms a low boiling chloride, from an ore containing such metal in a complex oxyfluoride form, that is nonrefractory to reductive chlorination and that contains a predominant proportion of gangue materials, comprising activating said ore for reductive chlorination by intimately contacting the ore in finely divided form in a fluidized bed with air in the proportion of about 0.1 to 0.2 cubic foot per pound of ore per minute, for about 45 to 65 minutes, at an elevated temperature in the range of about 300° to 450° C. and about 0° to 50° C. above the temperature at which reductive chlorination is subsequently effected, and thereafter, as a second step, forming a vaporous chloride of said metal by reductive chlorination of the activated ore in the substantial absence of oxygen gas in a fluidized bed with a vapor phase reductive chlorinating agent that forms a nonhydrogenous reducing agent at the conditions of the reaction, said agent being selected from the group consisting of phosgene, octachloropropane, hexachloroethane, sulfur monochloride, sulfur dichloride and carbon tetrachloride, in a proportion such as to provide about 5 to 20 times the stoichiometric amount of chlorine required to react with said metal, at a temperature sufficient to form said vaporous metal chloride and insufficient to chlorinate a substantial proportion of the gangue materials, said temperature being in the range of about 300° C. to 400° C., removing vapor phase materials, including said vaporous metal chloride, from the reaction mixture and recovering said metal chloride therefrom.

8. An extractive metallurgical process for extracting in chloride form columbium from columbium pyrochlore ore that nonrefractory to reductive chlorination and that contains a predominant proportion of gangue materials, comprising activating said ore for reductive chlorination by intimately contacting the ore in finely divided form in a fluidized bed with air in the proporton of about 0.1 to 0.2 cubic foot per pound of ore per minute, for about 45 to 65 minutes, at an elevated temperature in the range of about 300° to 450° C. and about 0° to 50° C. above the temperature at which reductive chlorination is subsequently effected, and thereafter, as a second step, forming vaporous columbium pentachloride by reductive chlorination of the activated ore in the substantial absence of oxygen gas in a fluidized bed with a vapor phase reductive chlorinating agent that forms a nonhydrogenous reducing agent at the conditions of the reaction, said reductive chlorinating agent being selected from the group consisting of phosgene, octachloropropane, hexachloroethane, sulfur monochloride, sulfur dichloride and carbon tetrachloride, in a proportion such as to provide about 5 to 20 times the stoichiometric amount required to react with said metal, at a temperature sufficient to form said vaporous columbium pentachloride and insufficient to chlorinate a substantial proportion of the gangue materials, said temperature being in the range of about 300° to 400° C., removing vapor phase materials, including said vaporous columbium pentachloride, from the reaction mixture and recovering said columbium pentachloride therefrom.

9. The process of claim 8 where the reductive chlorinating agent is phosgene.

References Cited by the Examiner

UNITED STATES PATENTS

| | | | |
|---|---|---|---|
| 2,030,867 | 2/36 | Hart | 23—87 X |
| 2,191,819 | 2/40 | Albin | 75—1 |
| 2,345,210 | 3/44 | Muskat | 23—98 |
| 2,481,584 | 9/49 | Fowler | 23—19 |
| 2,723,902 | 11/55 | Reeve et al. | 23—87 |
| 2,766,112 | 10/56 | Schafer | 23—87 X |
| 2,797,155 | 6/57 | Vaughan | 23—87 X |
| 2,870,073 | 1/59 | Merlub-Sobel et al. | |
| 2,876,074 | 3/59 | Johnson. | |

MAURICE A. BRINDISI, *Primary Examiner.*

GEORGE D. MITCHELL, *Examiner.*

UNITED STATES PATENT OFFICE
CERTIFICATE OF CORRECTION

Patent No. 3,212,847                      October 19, 1965

Bernard J. Lerner

It is hereby certified that error appears in the above numbered patent requiring correction and that the said Letters Patent should read as corrected below.

Column 4, line 9, for "rotating" read -- roasting --; line 20, for "active" read -- activate --; column 10, line 28, for "that nonrefractory" read -- that is nonrefractory --.

Signed and sealed this 16th day of August 1966.

(SEAL)
Attest:

ERNEST W. SWIDER                      EDWARD J. BRENNER
Attesting Officer                      Commissioner of Patents